United States Patent Office 3,418,309
Patented Dec. 24, 1968

3,418,309
BENZOTHIAZOLYL MONOAZO DYES
John I. Dale III, and Max A. Weaver, Kingsport, Tenn., assignors to Eastman Kodak Company, Rochester, N.Y., a corporation of New Jersey
No Drawing. Filed Oct. 22, 1965, Ser. No. 502,429
8 Claims. (Cl. 260—158)

ABSTRACT OF THE DISCLOSURE

Benzothiazolyl-azo-aniline compounds containing a dicarboximidoalkylsulfonylalkyl group attached to the aniline nitrogen atom are useful as dyes for hydrophobic textile materials.

This invention relates to novel water-insoluble azo compounds and, in particular, to benzothiazolylazo dyes for natural and synthetic fibers, yarns and fabrics.

The novel azo compounds of the invention are characterized by the general formula

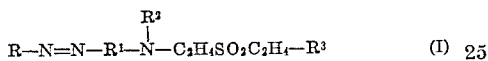

$$R-N=N-R^1-N(R^2)-C_2H_4SO_2C_2H_4-R^3 \quad (I)$$

wherein R represents a 2-benzothiazolyl radical, e.g. a radical having the structure:

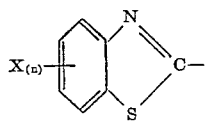

wherein X may be lower alkyl, e.g. methyl; lower alkoxyl, e.g. methoxyl; cyano; halogen, e.g. chlorine; thiocyano; lower alkylthio, e.g. methylthio; lower alkylsulfonyl, e.g. methylsulfonyl; nitro; lower carbalkoxy, e.g. carbomethoxy; sulfamoyl; lower cyanoalkylsulfonyl, e.g. cyanoethylsulfonyl or hydroxyalkylsulfonyl, e.g. hydroxyethylsulfonyl, and (n) is 0 or 1;

$R^1$ represents a substituted or nonsubstituted monocyclic, carbocyclic aromatic group of the benzene series, e.g. p-phenylene or p-phenylene substituted with lower alkyl, e.g. o,m-methyl-p-phenylene; lower alkoxy, e.g. o,m-methoxy-p-phenylene; halogen, e.g. o,m-chloro-p-phenylene; lower alkylthio, e.g. o,m-methylthio-p-phenylene; lower alkanoylamino, e.g. o,m-acetamido-phenylene; lower alkylsulfonamido, e.g. o,m-methylsulfonamido-p-phenylene; or benzamido, e.g. benzamido-p-phenylene.

$R^2$ represents hydrogen or an alkyl radical including nonsubstituted alkyl, preferably lower alkyl, i.e. from 1 to 4 carbon atoms, and substituted alkyl such as hydroxyalkyl, e.g. hydroxyethyl; polyhydroxylalkyl, e.g. 2,3-dihydroxypropyl; lower alkoxyalkyl, e.g. methoxyethyl; cyanoalkyl, e.g. cyanoethyl; cyanoalkoxyalkyl, e.g. β-cyanoethoxyethyl; lower alkanoyloxyalkyl, e.g. acetoxyethyl; lower carbalkoxyalkyl, e.g. carbethoxyethyl; halogenoalkyl, e.g. chloroethyl; hydroxyhalogenoalkyl, e.g. β-hydroxy-γ-chloropropyl; lower alkylsulfonylalkyl, e.g. methylsulfonylethyl; lower alkyl—OCOOCH₂CH₂—, e.g. CO₃OCOOCH₂CH₂; carbamoylalkyl, e.g. carbamoylethyl; lower alkylcarbamoylalkyl, e.g. ethylcarbamoylethyl; benzyl, phenoxyalkyl, e.g. β-phenoxyethyl; lower alkylsulfonamidoalkyl, e.g. methylsulfonamidoethyl, etc. or $R^2$ represents a monocyclic carbocyclic aromatic radical of the benzene series, e.g. nonsubstituted phenyl and substituted phenyl such as represented by $R^1$ above, e.g. lower alkylphenyl, lower alkoxyphenyl, halophenyl, etc. A preferred group represented by $R^2$ includes hydrogen, alkyl, alkoxyalkyl, phenoxyalkyl, alkanoyloxy, haloalkyl, hydroxyalkyl, carbethoxyalkyl, carbamoylalkyl, alkylsulfonylalkyl or cyanoalkyl, the alkyl groups of which are lower alkyl. As can be seen from the examples given below, the substituents attached to the R, $R^1$ and $R^2$ groups serve primarily as auxochrome groups to control the color of the azo compound.

$R^3$ represents a dicarboximido radical, e.g. a radical having the structure:

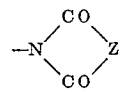

wherein Z represents a hydrocarbon radical or group of carbon atoms necessary to complete the ring. Such radical or group of carbon atoms may be substituted or nonsubstituted; e.g. vinylene (—CH=CH—); alkylene (—CH₂CH₂—); o-arylene, e.g. o-phenylene

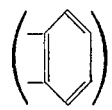

o-haloarylene, e.g. o-chlorophenylene; hydroxyalkylene, haloalkylene, e.g. chloroethylene and the like, and including cycloalkylene, e.g. pentamethylene.

The novel azo dyes of the invention, characterized by Formula I above, are prepared by coupling a conventional diazonium salt of an aminobenzothiazole compound having the structure:

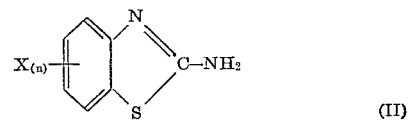

with a coupling component having the structure:

$$R^1-N(R^2)-C_2H_4SO_2C_2H_4-R^3 \quad (III)$$

Thus, the schematic reaction is illustrated as follows:

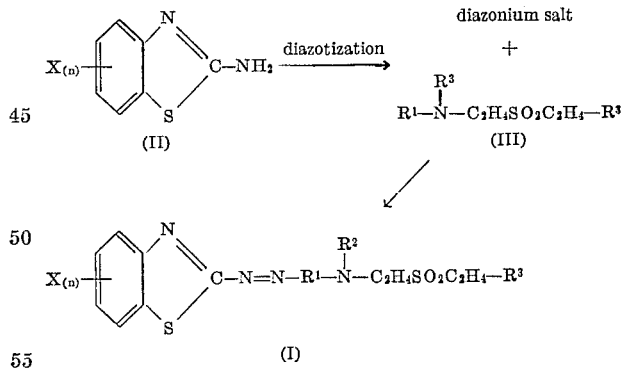

The coupling components represented by structure (III), above, are prepared by the reaction of an alkyl- or aryl-dicarboximide with a vinylsulfonylethylaniline derivative, the reaction being schematically illustrated as follows:

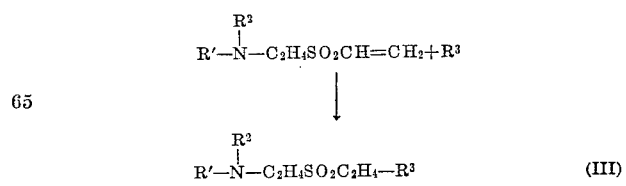

$$R'-N(R^2)-C_2H_4SO_2CH=CH_2+R^3$$

$$\downarrow$$

$$R'-N(R^2)-C_2H_4SO_2C_2H_4-R^3 \quad (III)$$

The preparation of the coupling components and the dyes produced therefrom will be more fully illustrated by the following examples.

Example 1

(a) *Preparation of the coupler.*—One ml. of 40% aqueous Triton B was added to a stirred slurry of 4.45 g. succinimide, 0.5 g. hydroquinone and 25 ml. dioxane. A solution of 12.65 g. N-β-vinylsulfonylethyl-N-ethyl-m-toluidine (prepared by the reaction of N-ethyl-m-toluidine and divinylsulfone in the presence of acetic acid and a hydrocarbon solvent) in 15 ml. dioxane was added dropwise during 15 minutes. The reaction mixture was stirred and heated at reflux for 2½ hours, then drowned in water. The solid which formed was crystallized from ethanol. It melted at 117–118°.

*Analysis.*—Calc'd.: C, 58.0; H, 6.9; N, 7.8. Found: C, 58.12; H, 6.8; N, 7.82.

This procedure was used to prepare all couplers.

(b) *Preparation of the dye.*—An amount of 0.72 g. sodium nitrite was added portionwise to 5 ml. conc. $H_2SO_4$, the solution was cooled in an ice bath to about 2° C. and 10 ml. 1:5 acid (1 part propionic:5 parts acetic) was added below 15° C. Then, at below 10° C., 1.75 g. 2-amino-6-cyanobenzothiazole was added followed by 10 ml. 1:5 acid. The reaction was stirred 2 hours at 0–5° and added to a solution of 3.42 g. of the above coupler dissolved in 100 ml. of 1:5 acid at 5° C. Solid ammonium acetate was added until the solution turned Congo Red paper brown and the coupling was allowed to stand 2 hours at ice bath temperature. It was then drowned with water, filtered, washed with water and air dried. The product dyes cellulose acetate and polyesters bright red shades and has the structure:

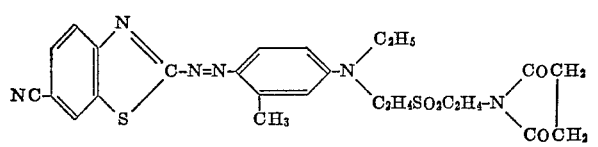

Example 2

A solution of 2.28 g. 2-amino-6-methylsulfonylbenzothiazole in 50 g. 50% sulfuric acid was cooled to −5° C. and a solution of 0.72 g. of $NaNO_2$ dissolved in 5 ml. conc. $H_2SO_4$ was added, keeping the temperature less than 0° C. The diazotization reaction was stirred 1.75 hours at 0° C., then added to a solution of 4.00 g. N-2-(phthalimidoethylsulfonyl)ethyl-N-ethyl-m - toluidine, prepared in accordance with the procedure of Example 1(a), dissolved in 100 ml. 15% $H_2SO_4$, all at about 5° C. The coupling was continued at this temperature for 2 hours, then drowned with $H_2O$, filtered, washed with $H_2O$ and the dye dried in air. The product dyes cellulose acetate and polyester fibers a brilliant red shade with good fastness properties. The dye has the structure:

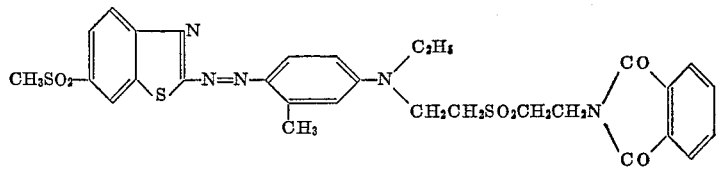

Example 3

A diazonium solution was prepared as in Example 2 from 2.28 g. 2-amino-6-methylsulfonylbenzothiazole and identical quantities of other reagents. The resulting solution was added to a solution of 3.42 g. of N-2-(succinimidoethylsulfonyl)ethyl-N-ethyl-m-toluidine in 100 ml. 15% $H_2SO_4$, all at about 5° C. The coupling was continued for 2 hrs., then drowned in water, filtered and washed with $H_2O$ and the dye dried in air. The product dyes cellulose acetate and polyester fibers brilliant red shades with good fastness. It has the structure:

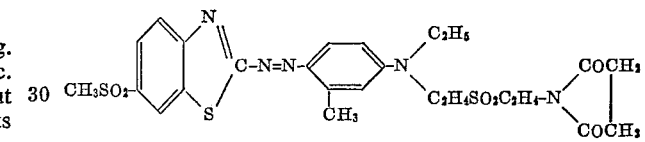

Example 4

A diazonium solution was prepared as in Example 1 from 1.75 g. 2-amino-6-cyanobenzothiazole using the same quantities of other reagents. The diazonium solution thus obtained was added to a solution of 4.00 g. N-2-(phthalimidoethylsulfonyl)ethyl-N-ethyl-m - toluidine in 100 ml. 1:5 acid at 5° C. Solid ammonium acetate was added until a brown color was obtained on Congo Red paper and the coupling was allowed to stand 2 hrs. at the ice-bath temperature. It was then drowned in water, filtered, washed with water and air dried. The product dyes cellulose acetate and polyesters bright red light fast shades. It has the structure:

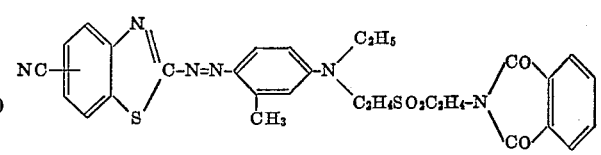

Example 5

A diazonium solution was prepared as in Example 1 using 1.95 g. 2-amino-6-nitrobenzothiazole instead of 2-amino-6-cyanobenzothiazole and using identical amounts of the other reagents. The diazonium solution thus prepared was added to a solution of 4.00 g. of N-2-(phthalimidoethylsulfonyl)ethyl-N-ethyl-m-toluidine in 100 ml. 1:5 acid at 5° C. Solid ammonium acetate was added until a brown color was obtained on Congo Red paper. After coupling for 2 hrs. at ice-bath temperature the solution was drowned in water, filtered, washed with water and air dried. The dye thus obtained gives fast bluish-red shades when dyed on cellulose acetate and polyester fibers. It has the structure:

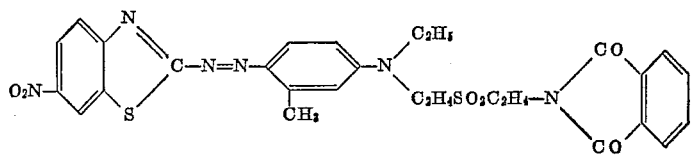

Example 6

A diazonium solution was prepared as in Example 5 from 2-amino-6-nitrobenzothiazole using the same quantities of reagents. The resulting solution was added to a solution of 3.42 g. N-2-(succinimidoethylsulfonyl) ethyl-N-ethyl-m-toluidine in 100 ml. 1:5 acid at 5° C. After neutralization to a brown color on Congo Red paper with solid ammonium acetate, the coupling was continued for 2 hrs. The reaction mixture was drowned in water, filtered, washed with water and air dried. The dye thus obtained dyes polyester and cellulose acetate light fast blue-red shades. The dye has the structure:

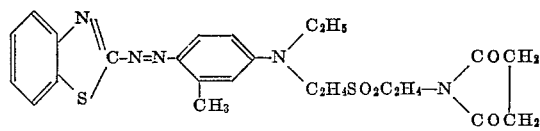

In accordance with the procedures illustrated in Examples 1 through 6, additional benzothiazolylazo dyes were prepared corresponding to the formula

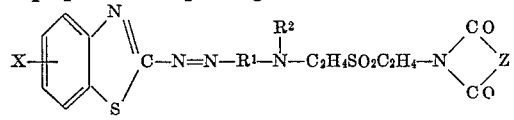

wherein X, $R^1$, $R^2$ and Z are set forth in the following table:

TABLE

| Example No. | X | $R^1$ | $R^2$ | Z | Color |
|---|---|---|---|---|---|
| 7 | 6-CH$_3$SO$_2$— | Phenylene | —C$_2$H$_5$ |  | Red. |
| 8 | 6-CH$_3$SO$_2$— | m-Tolylene | —CH$_3$ | —CH$_2$<br>\|<br>—CH$_2$ | Red. |
| 9 | 6-CH$_3$SO$_2$— | m-CH$_3$O-tolylene | —C$_2$H$_5$ | $\diagdown$(CH$_2$)$_3$ | Violet. |
| 10 | 6-CH$_3$SO$_2$— | m-Cl-phenylene | —C$_2$H$_5$ | $\diagdown$CHOH<br>$\diagup$CH$_2$ | Red. |
| 11 | 6-CH$_3$SO$_2$— | o-Tolylene | —H | $\diagdown$CHOCOCH$_3$<br>$\diagup$CH$_2$ | Scarlet. |
| 12 | 6-CH$_3$SO$_2$— | 2,5-di-OCH$_3$-phenylene | —C$_2$H$_5$ | CH$_2$— | Violet. |
| 13 | 6-CH$_3$SO$_2$— | m-NHCOCH$_3$-phenylene | —C$_2$H$_5$ |  | Do. |
| 14 | 6-NO$_2$ | m-Tolylene | —C$_2$H$_5$ |  | Do. |
| 15 | 6-NO$_2$ | do | —C$_2$H$_4$OH | $\diagdown$CHCH$_3$<br>$\diagup$CHCH$_3$ | Do. |
| 16 | 6-NO$_2$ | do | —C$_2$H$_4$Cl | —CHCl<br>\|<br>—CH$_2$ | Do. |
| 17 | 6-CN | Phenylene | —C$_2$H$_4$Br |  | Red. |
| 18 | 6-CN | m-Tolylene | —C$_2$H$_4$OCH$_3$ |  | Red. |
| 19 | 6-CN | do | —C$_2$H$_4$CO$_2$C$_2$H$_5$ |  | Red. |
| 20 | 6-CN | do | —C$_2$H$_4$SO$_2$CH$_3$ |  | Red. |

TABLE—Continued
| Example No. | X | R¹ | R² | Z | Color |
|---|---|---|---|---|---|
| 21 | 6-CN | do | —C₂H₄CN |  | Red. |
| 22 | 5-CN | do | —C₂H₄CONH₂ |  | Red. |
| 23 | 6-SO₂NH₂ | do | —C₂H₅ |  | Red. |
| 24 | 6-SO₂NH₂ | do | n-C₄H₉ |  | Red. |
| 25 | 6-SO₂CH₂CH₂OH | do | —C₂H₅ |  | Red. |
| 26 | 6-SO₂CH₂CH₂CN | do | —C₂H₅ |  | Red] |
| 27 | 6-CH₃ | do | —C₂H₅ |  | Scarlet |
| 28 | None | do | —C₂H₅ |  | Do. |
| 29 | 6-OCH₃ | do | —C₂H₅ |  | Do |
| 30 | 6-SCH₃ | do | —C₂H₅ |  | Do. |
| 31 | 6-SO₂C₄H₉(n) | do | —C₂H₅ |  | Red. |
| 32 | 6-SO₂N(CH₃)₂ | do | —C₂H₅ |  | Red. |
| 33 | 4,6-dichloro | do | —C₂H₅ |  | Red. |
| 34 | 6-bromo | Phenylene | —C₂H₅ |  | Scarlet. |
| 35 | 6-NHCOCH₃ | m-Tolylene | —C₂H₅ |  | Red. |

TABLE—Continued

| | | | | | |
|---|---|---|---|---|---|
| 36 | 6-SCH$_2$CH$_2$CN | do | —C$_2$H$_5$— | 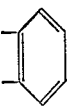 | Red. |
| 37 | 4-CH$_3$—6—NO$_2$ | do | —C$_2$H$_5$— |  | Violet |
| 38 | 6-SCN | do | —C$_2$H$_5$— | 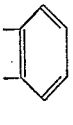 | Red. |

The azo compounds of the invention can be used for dyeing textile materials including synthetic polymer fibers, yarns and fabrics giving a variety of brillient violet to red shades when applied thereto by conventional dye methods. The azo compounds have good affinity for cellulose ester and polyamide fibers. When the azo compounds are used for dyeing such hydrophobic materials, they should be free of water-solubilizing groups such as sulfo and carboxyl. In general, the dyes have good fastness, for example, to light, washing, gas (atmospheric fumes) and sublimation. The dyes show outstanding sublimation fastness on polyesters.

As described above, the present azo compounds are characterized by an imidoethylsulfonylethyl group. This distinctive structure imparts unexpected properties to the present azo compounds, especially when the azo compounds are used for dyeing textiles, including improved fastness to light and improved affinity for polyester fibers. Thus, the azo compounds of the invention can be expected to be superior to similar but distinct benzothiazolylazo dyes when tested by methods such as described in the A.A.T.C.C. Technical Manual, 1964 edition, depending in part upon the particular dye used and the fiber being dyed.

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried. Accordingly, since the azo compounds of the invention are water-insoluble, they can be applied from aqueous dispersons in the manner of the so-called "dispersed dyes." However, coloration can also be effected, for example, by incorporating the azo compounds into the spinning dope and spinning the fiber as usual. The azo compounds of the invention have varying utility as dyes. The degree of utility varies, for example, depending upon the material being dyed and the formula of the azo compound. Thus, for example, all the dyes will not have the same degree of utility for the same material. The substituents on the R, R$^1$ and R$^2$ radicals serve primarily as auxochrome groups to control the color of the azo compound.

Polymeric linear polyester materials of the terephthalate type are illustrative of the linear aromatic polyester textile materials that can be dyed with the new azo compounds of our invention. The terephthalate fibers sold under the trademarks "Kodel," "Dacron," and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363 for example, can be dyed. The linear aromatic polyester materials specifically named have a melting point of at least 200° C.

Nylon, in fiber, yarn and fabric form, is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A water-insoluble azo compound having the formula

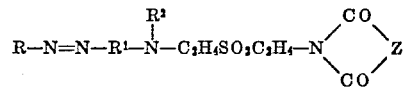

wherein

R represents a 2-benzothiazolyl radical;

R$^1$ represents p-phenylene or p-phenylene substituted with lower alkyl, lower alkoxy, chlorine, bromine, lower alkanoylamino, lower alkylsulfonamido, benzamido, or lower alkythio;

R$^2$ represents hydrogen; lower alkyl; lower alkyl substituted with hydroxy, lower alkoxy, cyano, lower alkanoyloxy, lower carbalkoxy, chlorine, bromine, lower alkylsulfonyl, lower alkyl-OCOO—, carbamoyl, lower alkylcarbamoyl, phenyl, phenxy, or lower alkylsulfonamido; phenyl; or phenyl substituted with lower alkyl, lower alkoxy, or halogen; and Z represents ethylene, ethylene substituted with chlorine, bromine, hydroxy, methyl, or acetoxy; propylene; cyclopentylene; cyclohexylene; o-phenylene; or o-phenylene substituted with chlorine or bromine.

2. A water-insoluble azo compound having the formula

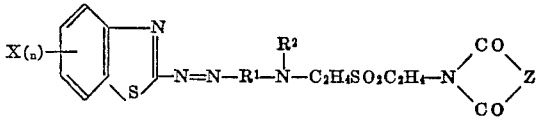

wherein

X represents lower alkyl, lower carbalkoxy, cyano, thiocyano, nitro, chlorine, bromine, lower alkylthio, lower alkylsulfonyl, lower cyanoalkylsulfonyl, lower hydroxyalkylsulfonyl, or sulfamoyl;

$n$ represents 0 or 1;

$R^1$ represents p-phenylene, lower alkyl-p-phenylene, lower alkoxy - p - phenylene, chloro - p - phenylene, bromo - p - phenylene, or lower alkanoylamino-p-phenylene;

$R^2$ represents lower alkyl or lower alkyl substituted with chlorine, bromine, hydroxy, lower alkoxy, lower alkylsulfonyl, cyano, or carbamoyl; and Z represents ethylene, propylene, vinylene, or o-phenylene.

3. The dye:

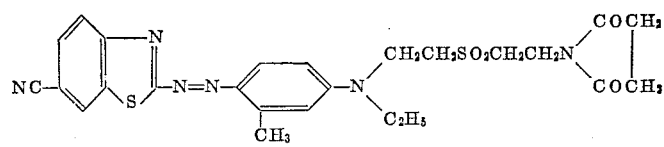

4. The dye:

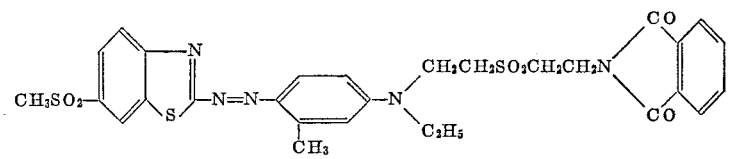

5. The dye:

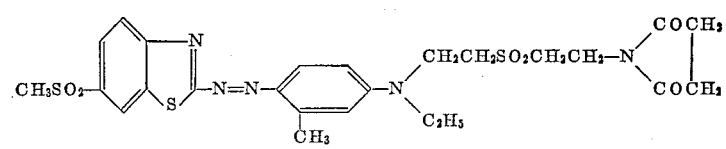

6. The dye:

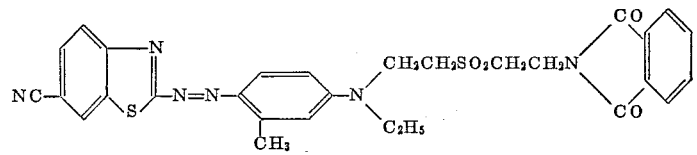

7. The dye:

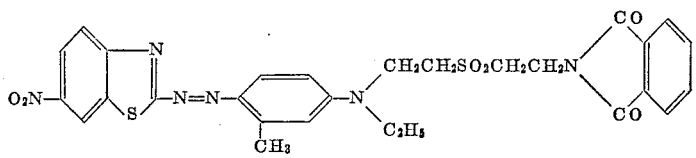

8. The dye:

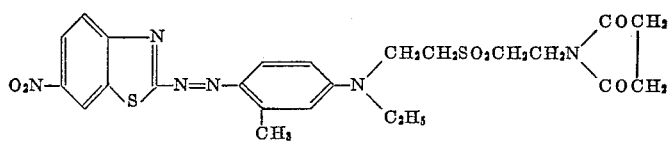

References Cited

UNITED STATES PATENTS 3,161,631  12/1964  Straley et al. _____ 260—158

CHARLES B. PARKER, *Primary Examiner.*

U.S. Cl. X.R.

8—41, 54.2, 55; 260—37, 281, 305, 326, 326.3, 326.5